United States Patent [19]

Galberth et al.

[11] 4,136,309

[45] Jan. 23, 1979

[54] POWER OUTPUT CONTROL CIRCUIT FOR SOLAR-POWERED CATHODIC PROTECTION SYSTEM

[76] Inventors: Robert L. Galberth, 12452 Gilbert, Garden Grove, Calif. 92641; Roy L. Arnold, 16262 Wishingwell La., Huntington Beach, Calif. 92647; John C. Bollinger, 9181 Heatherton Cir., Huntington Beach, Calif. 92646

[21] Appl. No.: 812,149

[22] Filed: Jul. 1, 1977

[51] Int. Cl.² .......................... H02J 7/00; H01B 7/28
[52] U.S. Cl. ......................................... 320/2; 307/66; 307/95; 323/15
[58] Field of Search ......................................... 320/2-5, 320/6, 15; 307/66, 95; 323/15

[56] References Cited
U.S. PATENT DOCUMENTS

| | | | |
|---|---|---|---|
| 3,816,804 | 6/1974 | Cardwell, Jr. | 323/15 X |
| 3,859,588 | 1/1975 | Titus | 307/95 X |

OTHER PUBLICATIONS

"Control of Pipeline Corrosion", A. Peabody, Nat'l. Assoc. of Corrosion Engrs., 1967.

*Primary Examiner*—Robert J. Hickey
*Attorney, Agent, or Firm*—Jackson & Jones

[57] ABSTRACT

Metallic structures located in an electrolyte, such as soil or water, for example, tend to corrode. In order to prevent metal loss from the structure due to corrosion, a D.C. current flow is created in the metal structure. This current flow causes a hydrogen ion film to form on the structure which insulates it from the electrolyte. The direct current is supplied to the metal structure by a combination of a solar array and storage batteries. During peak solar activity, the solar array both charges the batteries and supplies current to the metal structure. When the batteries are fully charged, the batteries are disconnected and the entire solar array output is applied to the metal structure. If solar activity decreases below a predetermined level, the batteries are switched back into the circuit to maintain current flow at a predetermined minimum level.

8 Claims, 1 Drawing Figure

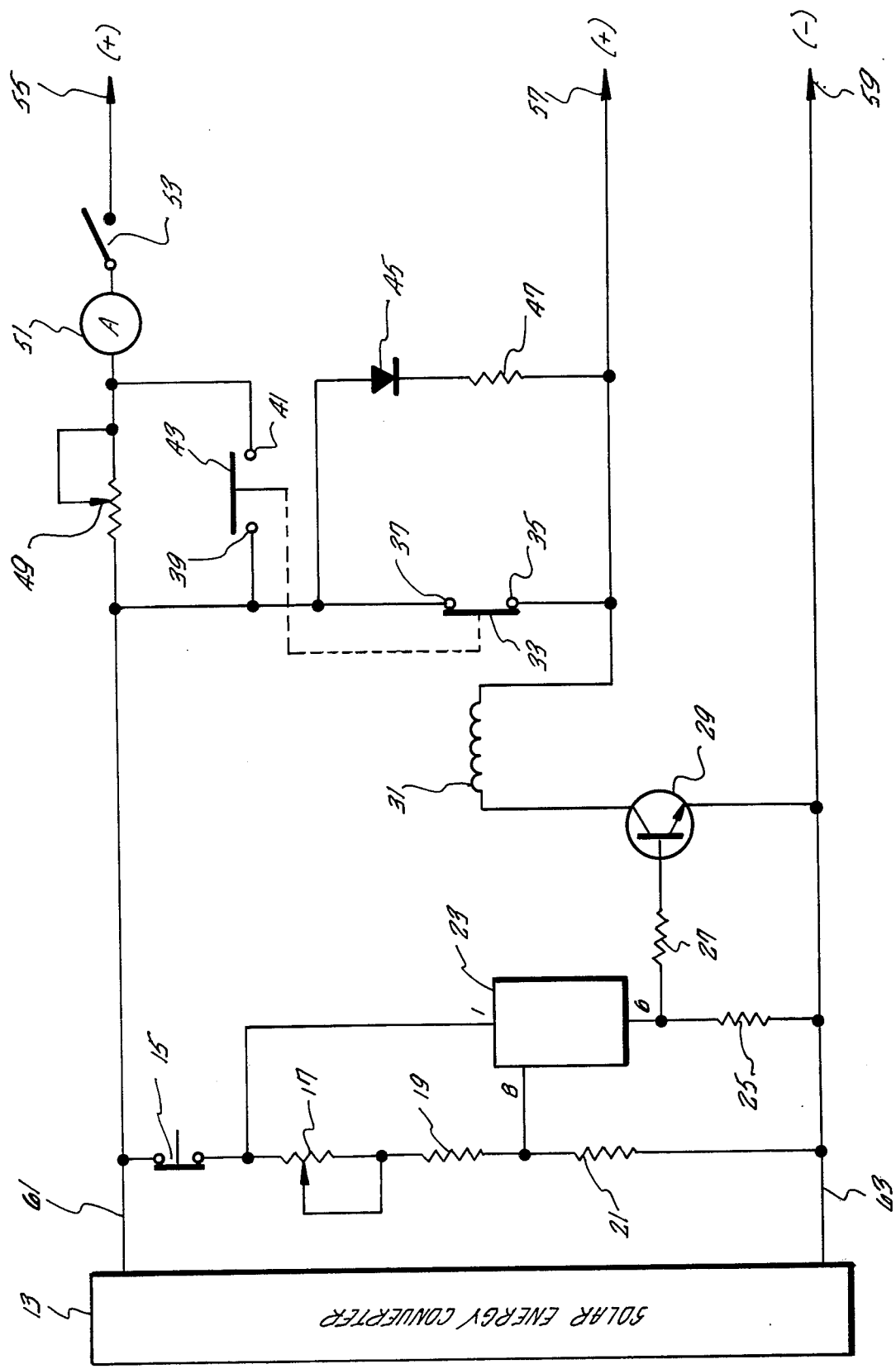

POWER OUTPUT CONTROL CIRCUIT FOR SOLAR-POWERED CATHODIC PROTECTION SYSTEM

BACKGROUND OF THE INVENTION

The present invention relates generally to improvements in photovoltaic cathodic protection systems for metal structures, such as oil well casings, and, more particularly, pertains to a new and improved power output control circuit for such protection systems wherein the electrical output of a solar energy converter and the electrical output of a battery are utilized together.

The application of direct current to a metallic structure in an electrolyte, such as soil or water, for example, to prevent loss of metal from the metallic structure due to electrolytic corrosion is a known technique. The process involves essentially the formation of a hydrogen ion film on the metallic structure located in the ground or water. This ion film is produced by the direct current flow. The ion film prevents corrosion of the metallic structure by shielding it from the action of the electrolyte.

The extent of the protective hydrogen ion film formed on the metallic structure, that is, the depth to which it is formed, is a function of the amount of current applied, soil resistivity, circuit resistance, and placement of current-discharging electrodes.

The direct current is normally applied to the metal structure by storage batteries. These batteries are kept charged by an array of solar panels, such as photovoltaic cells, which convert sunlight to electrical energy. The power output of the batteries to the metal structure is controlled by a resistive circuit that prevents excessive discharge of the batteries. This is necessary so that the batteries will not deliver more power to the metal structure than the solar panel array can return to the batteries.

To prevent overcharging of the batteries during periods of peak solar activity, a voltage regulator is used. This regulator provides a resistance circuit across the output of the solar array as the batteries approach full charge. After the batteries are fully charged, they continue to supply a current to the metallic structure. Any excess output of the solar array is dissipated by the resistance circuit in the form of heat. Such a system wastes the output of the solar array after the batteries of the system have been charged.

OBJECTS AND SUMMARY OF THE INVENTION

An object of this invention is to provide a highly efficient and effective self-sustaining cathodic protection system.

Another object of this invention is to provide a power output control circuit for a cathodic protection system which provides for increased protection from electrolytic corrosion.

Yet another object of this invention is to provide a simplified power control circuit protection system.

These objects and the general purpose of this invention are accomplished as follows. A control system senses the voltage output of a solar energy converter and the voltage output of a battery. As long as the voltage output of the battery is below a predetermined charge level, the solar energy converter is connected to charge the batteries, and the batteries are connected to supply D.C. voltage to the metal structure being protected from electrolytic corrosion. As soon as the predetermined charge level is reached on the batteries and the output of the solar energy converter is above a predetermined minimum level, the batteries are switched out of the circuit. The entire output of the solar energy converter is then supplied to the metal structure.

BRIEF DESCRIPTION OF THE DRAWINGS

Other objects and many of the attendant advantages of this invention will be readily appreciated as the same becomes better understood by reference to the following detailed description, when considered in conjunction with the accompanying drawings in which like reference numerals designate like parts throughout the figures thereof, and wherein:

The FIGURE is a circuit diagram of the preferred embodiment of the control system of the present invention.

DESCRIPTION OF THE PREFERRED EMBODIMENT

The control system of the present invention essentially comprises a solar energy converter 13, which may be a photovoltaic cell array, for example, which is connected to the metal structure to be protected at terminal 55 and across a storage battery connected to terminals 57, 59. An integrated circuit chip 23, which may be a standard voltage regulator chip, such as the TL 430, manufactured by Texas Instruments, monitors the voltage output of the solar energy converter 13 at its inputs 1 and 8, and, in response thereto, generates a voltage at output 6, which is a control signal for transistor amplifier switch 29.

Transistor amplifier switch 29 energizes and de-energizes a relay 31, which controls a normally closed switch 33 and a normally open switch 43. Normally open switch 43 shunts a variable resistor 49 that regulates the current flow to the metal structure through a D.C. ammeter 51 and a manually operable switch 53.

During periods of low solar activity, the switch 33 is in its normally closed state and connects contact points 37 and 35, as shown. Switch 33 can be any of a variety of high current switches. For example, it may comprise a plurality of parallel paths rather than one path as shown. The switch 43 is in its normally open state when the relay 31 is de-energized. As a result, the battery, connected to terminals 57, 59, supplies current to the load through closed switch 33, current limiting adjustable resistor 49, ammeter 51, switch 53, if it is closed, and terminal 55.

Diode 45 and resistor 47 provide for current flow to the positive terminal 57 of the battery when the potential difference between the positive terminal of the battery, connected to terminal 57, is less than the potential of the positive output of solar energy converter 13 on terminal 61. This, however, will not be the case during low solar activity, such as during nighttime hours. The trickle charge current through the diode is of sufficient magnitude to prevent the relay from acting as a vibrator if the battery connected to terminals 57, 59 happens to open circuit.

During the initial daylight hours, as solar activity increases, the energy output of the solar energy converter 13 also increases, thereby causing the positive voltage on terminal 61 to increase substantially with respect to the negative potential on terminal 63, which is connected to the negative terminal 59 of the battery. The battery, connected to terminals 57 and 59, continues to supply current to the load connected to terminal 55 until the solar energy converter 13 has a potential voltage output at terminal 61 that is a predetermined level above the positive voltage output of the battery at terminal 57. At this time, the output of the solar energy converter 13 is being utilized to both charge the battery and supply current to the load connected at terminal 55.

The amount of charging current supplied to the battery and to the load, connected at terminal 55, is determined, in part, by variable resistor 49, which regulates the current to the load. This charging process continues, the battery being charged through closed switch 33 until a predetermined percentage charge is reached on the battery as sensed by integrated circuit chip 23.

Variable resistor 17, resistor 19, and resistor 21, along with spring-loaded, normally closed, manual-operated switch 15, form a divider network across the battery terminals 57, 59 and the solar energy converter terminals 61, 63. The integrated circuit chip 23 senses the voltage output of the battery at the junction between resistors 19 and 21 at its number 8 input. The predetermined percentage charge desired is adjusted or is preset by adjusting variable resistor 17.

Once integrated circuit chip 23 senses this predetermined charge, it generates a voltage output at its output terminal 6, which is supplied to transistor amplifier switch 29 through resistor 27, thereby turning it on. Resistor 25 acts as a bias for transistor switch 29. As a result of transistor switch 29 conducting, relay 31 is energized, thereby opening normally closed switch 33 and closing normally open switch 43.

As a result, the low-impedance charging path to the battery terminals 57, 59 is broken and the adjustable current control resistor 49 to the load is shunted. Because contacts 37 and 35 are no longer connected, the battery terminal 57 is no longer connected to the load terminal 55. The entire current to the load at terminal 55 is being generated by solar energy converter 13. Any current being supplied to the battery terminals 57, 59 by the solar energy converter 13 through diode 45 and resistor 47 will be minimal because of the charged condition of the battery 57.

During the high solar activity period, a few milliamperes of current are also supplied to the integrated circuit 23 and to the transistor switch 29 for bias. The relay 31 is maintained energized by the batteries connected to terminals 57, 59. Therefore, essentially the entire output of the solar energy converter 13 is supplied to load terminal 55.

The peak output of the solar energy converter array is up to six times that of normal battery output. As a result of this higher current, the protective polarization film on the metal load structure is formed to a greater depth. It should be remembered that current control resistor 49 is also out of the load circuit.

As solar activity decreases, the output of the solar energy converter 13 also decreases. This is sensed by the integrated circuit chip 23 upon reaching a predetermined voltage level as sensed at input terminal 1. The integrated circuit chip 23 removes the voltage signal at output terminal 6, thereby turning off switch 29 and de-energizing relay 31. This returns the switch 33 to its normally closed state and switch 43 to its normally open state, thereby reconnecting the battery terminal 57 to the load terminal 55. As a result of the lowering voltage output at terminal 61 of the solar energy converter, the batteries will gradually supply more and more of the current to the load through current limiting resistor 49.

The manual-operated switch 53 connects the system to the metal load structure, connected at terminal 55. The manual-operated switch 15 is utilized to reconnect the batteries to the load during high solar activity periods for the purpose of adjusting the load current limiting resistor 49. This is accomplished as follows. By opening spring-loaded switch 15, integrated circuit chip 23 loses power and, therefore, its voltage output on ouput terminal 6 is decreased to a level which causes transistor switch 29 to turn off and de-energize relay 31, thereby closing switch 33 and opening switch 43. The battery connected to terminals 57, 59 is thereby placed back into the load circuit. The load control resistor 49 is also placed back into the load circuit. The load current limiting resistor 49 may then be adjusted as desired.

By allowing the entire output of the solar energy converter 13 to be connected directly to the metal load structure during peak solar activity without any current limiting, the depth of corrosion protection is increased on the metal structure. This protection is increased on the metal structure. This protection is maintained by the lower current output supplied by the battery during low solar activity.

What has been described is a highly efficient and effective, self-sustaining cathodic protection system which provides for increased protection from electrolytic corrosion, while itself being considerably simplified in structure and operation. It should be understood, of course, that the foregoing disclosure relates only to a preferred embodiment of the invention and that modifications may be made therein without departing from the spirit and scope of the invention as set forth in the appended claims.

What is claimed is:

1. A power output control system for a solar-powered cathodic protection system wherein a current is constantly supplied to a metal structure located in an electrolyte material, said system comprising:
   a solar energy converter connected to said metal structure;
   a battery connected to said solar energy converter to be charged thereby and connected to said metal structure;
   means for sensing the charge level on said battery when said battery is connected to said metal structure and for sensing the voltage output of said solar energy converter when said battery is disconnected from said metal structure; and
   means responsive to said sensing means indicating a predetermined charge level on said battery for disconnecting said battery from said metal structure and reducing the charging current to said battery.

2. The system of claim 1 further comprising a resistive control means for limiting the current flow from said battery to said metal structure.

3. The system of claim 2 further comprising means for disengaging said resistive control means at the time said battery is disconnected.

4. The system of claim 1 further comprising manually actuatable means for reconnecting said battery to said solar energy converter and said metal structure.

5. The system of claim 1 wherein said charge level sensing means reconnects a path from said battery to said solar energy converter and said metal structure, if the voltage output of said solar energy converter falls below a predetermined level.

6. The system of claim 5 further comprising a resistive control means for limiting the current flow from said battery to said metal structure.

7. The system of claim 6 further comprising means for disengaging said resistive control means at the time said battery is disconnected.

8. The system of claim 7 wherein said disengaging means re-engages said resistive control means at the time said battery is reconnected to said solar energy converter and said metal structure.

* * * * *